United States Patent [19]

Tracy

[11] Patent Number: 6,014,040

[45] Date of Patent: *Jan. 11, 2000

[54] BI-DIRECTIONAL SIGNAL TRANSMISSION SYSTEM

[75] Inventor: Philip A. Tracy, Epping, Australia

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/767,597

[22] Filed: Dec. 9, 1996

[30] Foreign Application Priority Data

Dec. 11, 1995 [AU] Australia ................ PN 7047

[51] Int. Cl.[7] .......................................... H03K 19/0175
[52] U.S. Cl. .............................. 326/90; 326/86
[58] Field of Search ................. 326/86, 90, 82, 326/21, 26

[56] References Cited

U.S. PATENT DOCUMENTS 5,428,800  6/1995  Hsieh et al. ..................... 395/775
5,438,281  8/1995  Takahashi et al. ................ 326/86

*Primary Examiner*—Michael Tokar
*Assistant Examiner*—Daniel D. Chang

[57] ABSTRACT

An interface device 3 is used to couple a first 101 and second 201 bi-directional signal path, such as 12C. The first bi-directional signal path 101 floats at a logic high level. Stations 110 coupled to the first signal path 101 are capable of generating a logic low level on the first signal path 101. To avoid that the system gets latched in a low state, a medium logic level is used on the first signal path 101. The interface device 3 generates the medium logic level on the first bi-directional signal path 101 in response to a low logic level on the second signal path 201. The interface device 3 generates on the second signal path 201 a low logic level in response to a low logic level on the first signal path and, otherwise, generates a high logic level. The stations 110 on the first signal path 101 detect the medium logic level and the low logic level as LOW and the high logic level as HIGH.

12 Claims, 2 Drawing Sheets

BI-DIRECTIONAL SIGNAL TRANSMISSION SYSTEM

BACKGROUND OF THE INVENTION

The invention relates to a bi-directional signal transmission system, for transmission of a binary signal in both directions. The invention further relates to an interface for such a system.

An example of a bi-directional signal transmission system is the well-known 12C-bus system, disclosed in, for instance, Philips Data Handbook IC12a, "12C-bus compatible ICs, Types MAB84XI family to PCF8579", 1989, pp. 31–53 and "The 12C bus and how to use it (including specifications)" 1995 by Philips Semiconductors. The 12C-bus system is a serial bus system with stations, that is, integrated circuits, that are interconnected through a bi-directional two-wire transmission channel, one wire for a binary data signal, and another for a binary clock signal, and that communicate according to a predetermined protocol. Dependent on its particular function within the system, each station can operate as transmitter or receiver, or both.

The data wire as well as the clock wire are connected to a positive supply voltage through pull-up resistors. The wires are floating high, when the stations do not communicate. Each station's output stage has an interface to the bus with an open collector or an open-drain which enables any one of the stations to pull down the voltage level on the bus to low.

The capacitive load of the 12C bus determines the length of the bus and the number of stations that can be connected to the bus. The bus capacitance is the total capacitance of wire, connections and IC pins. If the bus capacitance is increased, the bus will have to be run at lower speeds. Moreover the rise and falls of the bus become a problem.

It has been proposed that a bi-directional signal transmission system having a bus interface device may alleviate these problems. In these proposals the bus interface device is coupled to a first bi-directional data bus on one side and coupled on the other side to two logic paths, one for receiving and one for transmitting signals. These two logic paths being coupled to a second bi-directional data bus. However the systems so far proposed have major limitations and very restricted application. Some suffer from the problem of latching, namely when the receiving logic path goes low, the transmitting logic path on the bus interface goes low due to the bi-directional nature of the first data bus and the transmitting logic path just stays low. The bus is 'latched' in this low state. Others are conditionally stable but produce spurious logic signals and are prone to oscillate.

OBJECTS AND SUMMARY OF THE INVENTION

It is the object of the present invention to provide a bi-directional signal transmission system and a interface device which overcomes these problems. To this end the invention comprises a bi-directional signal transmission system comprising; a first bi-directional signal path capable of generating thereon a logic high level, one or more first stations coupled to the first bi-directional signal path and each capable of generating on the first bi-directional signal path a logic low level, an interface device coupled to the first bi-directional signal path and having a receive input and a transmit output, a second bi-directional signal path coupled to the receive input and the transmit output of the interface device, the interface device comprising, first means for generating on the first bi-directional signal path a medium logic level in response to a low logic level on the receive input, second means for generating on the transmit output a low logic level in response to a said low logic level on the first bi-directional signal path, otherwise generating a high logic level on said transmit output, wherein the one or more first stations are adapted to detect the medium and the low logic levels on the first bi-directional signal path as LOW and the high logic level on the first bi-directional signal path as HIGH.

The present invention has the advantage that a logic LOW will not propagate from the receive input to the transmit output via the first bi-directional signal path because of the medium logic level. This prevents the latching of the interface device. Consequently a second bi-directional signal path is able to be connected to the first bi-directional signal path via an interface device featuring minimal loading and thus overcoming the limitation on the the total number of stations that can be connected in the composite bi-directional system. Furthermore the present invention does not produce spurious logic levels and as such is not prone to oscillation.

In a preferred embodiment of the invention the first means of the interface device comprises an invertor, the input of which is coupled to the receive input and the output of which is connected to a base of an open collector transistor, and a voltage source which is connected between the first signal bi-directional signal path and the open collector transistor, the invertor in response to a high logic level on the receive input switching off the open collector transistor and in response to said low logic level on the receive input switching on the open collector transistor, the open collector transistor in the on state pulling the first signal bi-directional path down to said medium logic level and in the off state the first signal bi-directional path remaining at said high logic level.

In a further preferred embodiment of the invention the second means of the interface device comprises a comparator one input of which is coupled to the first signal bi-directional path, the other input of which is coupled to a voltage reference source Vmed, the comparator having an open collector transistor output coupled to the transmit output of the interface device, the second means generating on the transmit output said low logic level when the logic level on the first bi-directional signal path is below the voltage reference source Vmed, and generating on the transmit output a said high logic level when the logic level on the first bi-directional signal path is greater than the voltage reference source Vmed.

Another aspect of invention comprises an interface device for use in a bi-directional signal transmission system. The system includes; a first bi-directional signal path capable of generating thereon a logic high level, one or more first stations coupled to the first bi-directional signal path and each capable of generating on the first bi-directional signal path a logic low level, and a second bi-directional signal path, wherein the one or more first stations are adapted to detect a medium logic level and the low logic level on the first bi-directional signal path as LOW and the high logic level on the first bi-directional signal path as HIGH, the interface device adapted to be coupled to the first bi-directional signal path and having a receive input and a transmit output adapted to be coupled to the second bi directional signal path. The interface device includes:

first means for generating on the first bi-directional signal path said medium logic level in response to a low logic level on the receive input, and second means for generating on the transmit output a low logic level in response to a said low logic level on the first bi-directional signal path, otherwise generating a high logic level on said transmit output.

BRIEF DESCRIPTION OF THE DRAWINGS

The invention will be explained in further detail by way of example and with reference to the accompanying drawings in which.

DESCRIPTION OF THE PREFERRED EMBODIMENTS

Figure 1:
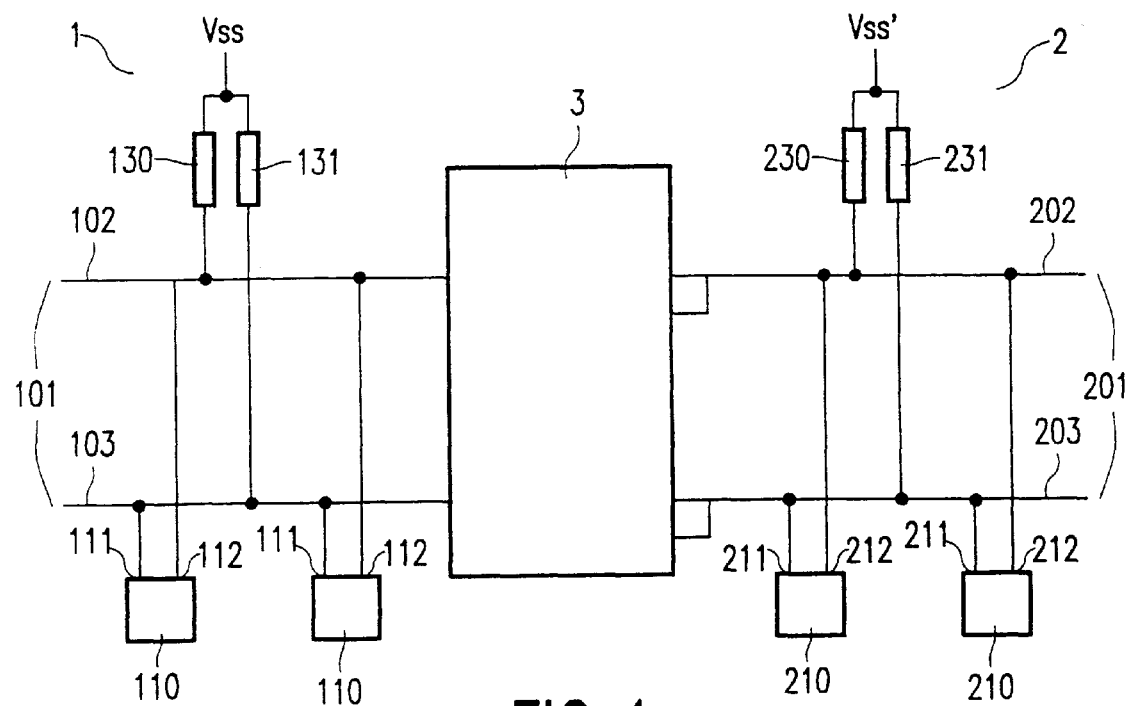
FIG. 1 shows a first embodiment of the bi-directional signal transmission system in accordance with the invention.

FIG. 1 shows a first example of a bi-directional signal transmission system in accordance with the invention. The bi-directional signal transmission comprises a first bi-directional signal transmission system 1 and a second bi-directional signal transmission system 2 with an interface device 3 coupled between the two systems.

The first bi-directional signal transmission system 1 has a bi-directional two-wire bus 101. The bus 101 includes a data wire 102 for data signal transport and a clock wire 103 for clock signal transport. The data signals and clock signals transmitted on the bus 101 are binary signals. Connected to the bus 101 are two stations 110. If desired more stations may be connected to the bus 101. However the number of stations 110 that can be connected to the bus 101 is limited by the total bus capacitance. For example the 400 pF limit specified for the 12C bus sets a practical limit of around 20 stations.

These stations 110 usually are integrated circuits which may include microcontrollers, general purpose circuits such as LCD drivers, remote I/O ports, RAM, EEPROM or data convertors or application oriented circuits such as digital tuning and signal processing circuits for radio and video systems, or DTMF generators for telephones with tone dialing.

While each of these individual stations 110 may be different and perform a different function, for example a microcontroller or a LCD, they all have the same I/O arrangements. For clarity's sake this arrangement will be described with reference to one station 110 which is shown in FIG. 2.

Figure 2:
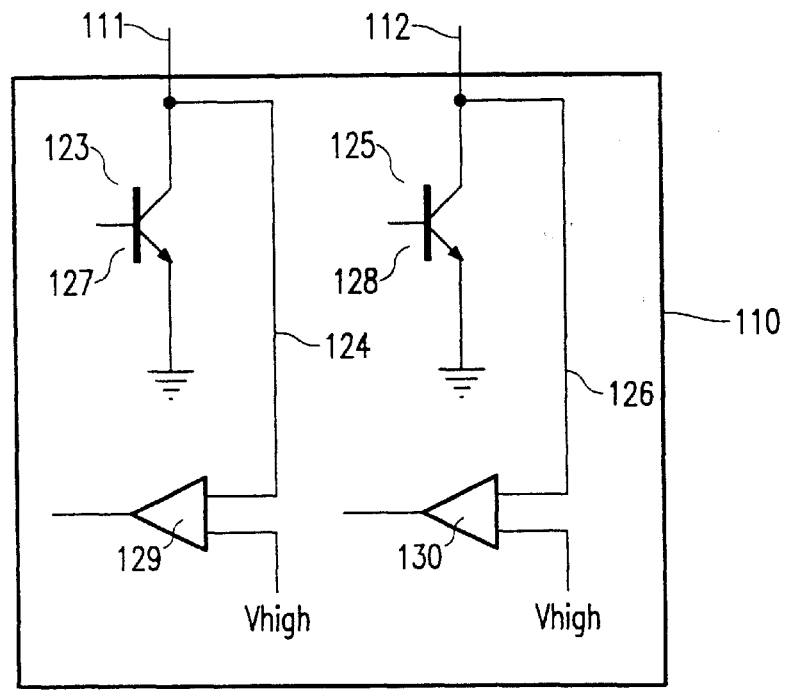
FIG. 2 shows a first embodiment of a station for use with the bi-directional signal transmission system shown in FIG. 1.

FIG. 2 shows a station 110 having a clock I/O 111 and a data I/O 112 which are respectively connected to the clock wire 103 and data wire 102 shown in FIG. 1. The data I/O 112 is connected to a data output stage 125 and a data input stage 126. The data output stage 125 consists of an open-collector transistor 128, which forms the data output of the inner circuitry of the station 110. The data input stage 126 consists of a comparator 130 one input of which is connected to the data I/O 12. The other input of the comparator 130 is connected to a reference voltage Vhigh. The output of the comparator 130 forming the data input of the inner circuitry of the station.

The clock I/O 111 of the station 110 is connected to a clock output stage 123 and clock input stage 124. The clock output stage 124 has an open-collector transistor 127 similar to that of the data output stage 125 and operates in a similar manner. The clock input stage 124 has a comparator 129 and reference voltage Vhigh similar to the data input stage 126 and operates in a similar manner. The further inner circuit details of the station 110 are not shown. The inner circuit details (e.g. the microcontroller circuitry or LCD circuitry or other) are not essential to the working of the invention and will not be described.

The manner in which the stations 110 communicate with each other is described with reference to FIGS. 1 and 2. The state of the bus 101 of the first bi-directional transmission system 1 will not be affected by the second bi-directional transmission system 2, in the absence of any communication from the latter system.

In FIGS. 1 and 2, the stations 110 communicate with each other by changing the state of the bus wires 102, 103 from HIGH to LOW and vice versa and by detecting whether the bus wires 102, 103 are in a HIGH or LOW state. The stations 110 detect that a data wire 102 is in a HIGH state when the voltage on the data wire 102 is greater than or equal to a reference voltage Vhigh and detect that the data wire 102 is in a LOW state when the voltage on the data wire 102 is less than said reference voltage Vhigh. The stations detect the state of the clock wire 103 in the same manner with respect to said reference voltage Vhigh.

In FIGS. 1 and 2, the stations 110 change the state of the clock and data wires 102,103 by switching on and off the open collector transistors 127 and 128 of the clock and data output stages 123 and 125. When each of the open collector transistors 127 and 128 of all the stations 110 are in an off state, the bus wires 102 and 103 are pulled up to a supply voltage Vss through pull-up resistors 130 and 131 respectively. The supply voltage Vss is chosen to be greater than said reference voltage Vhigh so in this situation the bus wires 102 and 103 are regarded by the stations 110 as being HIGH.

Any one of the stations 110 are able to pull the voltage on the data wire 102 to a voltage Vuu by switching on it's open collector transistor 128 of the data output stage 125. This data output stage 125 is designed so that the voltage Vuu is less than the said reference voltage Vhigh. Thus in the on state of the open collector transistor 128, the voltage of the data wire 102 is Vuu which is less than Vhigh, so the data wire 102 is detected by the stations 110 as being LOW. And in the off state of said transistors 128, the voltage on the data wire is Vss which is greater than Vhigh, so the data wire 102 is detected by the stations 110 as being HIGH.

Similarly any of the stations 110 are able to pull the voltage on the clock wire 103 to a voltage Vuu by switching on it's open collector transistor 127 of the clock output stage 123. As mentioned before this voltage Vuu is below the reference voltage Vhigh. Thus in the on state of the open collector transistor 127, the clock wire 103 is detected by the stations 110 as being LOW and in the off state of said transistors 127, the clock wire 103 is detected by the stations 110 as being HIGH.

All of the stations 110 connected to the bus 101 have a data and clock output stage 123 and 125. As such anyone of the stations 110 can pull the data or clock wires LOW. The data wire 102 will only be HIGH when ALL the open collector transistors 128 of ALL the stations 110 are switched off. Similarly for the clock wire 103.

Each of the stations 110 has a data and clock input stage 124 and 126 for detecting the state of the bus wires 102 and 103. The data input stage 125 shown in FIG. 2 has a comparator 130 with one input connected to the data I/O 112 of the station 110. The other input of the comparator 130 is connected to a voltage source having a voltage equivalent to said reference voltage Vhigh. When the voltage on the data wire 102 is above the reference voltage Vhigh the output of the comparator 130 is HIGH and when the voltage on the data wire 102 is below the reference voltage Vhigh the output of the comparator 130 is LOW. The clock input stage 123 shown in FIG. 2 operates in a similar manner on the clock bus wire 103.

Thus the stations 110 are able to communicate with each other in a binary manner. In the example shown in FIGS. 1 and 2, data is transferred from one station 110 to another station 110 in a serial manner under clock control according to the 12C protocol. As this protocol forms no part of the invention, reference is made to the above mentioned publications where it is described.

In FIG. 1, the second bi-directional signal transmission system 2 is similar to the first bi-directional transmission system 1. The second bi-directional transmission system 2 has the same features and operates in the same way as the first bi-directional two-wire transmission system and uses the same protocol. As in the first transmission system 1, the second transmission system 2 has a two-wire bi-directional bus 201 comprising a data wire 202 and clock wire 203, stations 210 having clock I/O 211 and data I/O 212 connected respectively to the clock wire 203 and data wire 202 of the bus 201, pull up resistors 230 and 231. The stations 110 of the first transmission system 1 and the stations 210 of the second transmission system 2 are similar in nature and operation. Station 102 has the same features as the station 110 shown in FIG. 2 and operates in the same way. The supply voltage Vss, voltage Vuu, reference voltage Vhigh of the first transmission system have a corresponding supply voltage Vss', voltage Vuu', reference voltage Vhigh' in the second transmission system. In the example shown the voltage levels for Vss', Vuu', Vhigh' are the same as Vss, Vuu, Vhigh respectively. However the actual voltage levels for both the first and second system may differ if desired. For example the voltage supply Vss in the first system may equal 3 volts whereas in the second system the voltage supply Vss' may equal 5 volts.

Again more stations 210 may be connected to the bus 201 if desired. Though as in the first transmission system 1, there is a upper limit to the number of stations 210 that may be connected to the bus 201.

Figure 3:
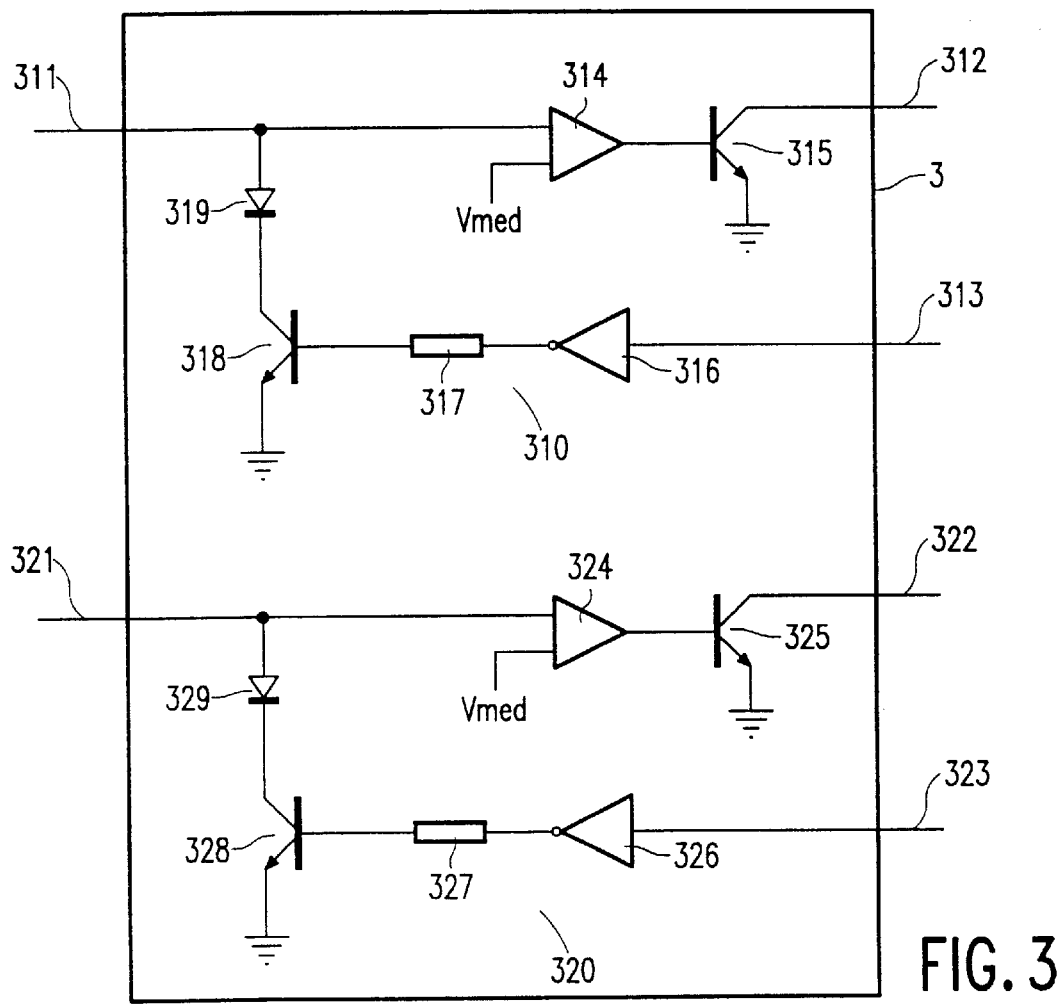
FIG. 3 shows a first embodiment of an interface device in accordance with the invention for use with the bi-directional signal transmission system shown in FIG. 1.

FIG. 3 shows the interface device 3 in detail which is coupled between the first and second bi-directional transmission systems 1 and 2 shown in FIG. 1. The interface device 3 consists of a separate data interface stage 310 and a clock interface stage 320. A data I/O 311 and a clock I/O 321 of the interface device 3 are respectively connected to the data wire 102 and the clock wire 103 shown in FIG. 1. The interface device 3 also has a data transmitting output 312 and a data receiving input 313 which are both connected to the data wire 202 as shown in FIG. 1. The interface device 3 further has a clock transmitting output 322 and a clock receiving input 323 which are both connected to the clock wire 203 as shown in FIG. 1.

The data I/O 311 of the data interface stage 310 is connected to an input of a comparator 314, the other input of which is connected to a reference voltage Vmed. The output of the comparator 314 is connected to the base of an open collector transistor 315, the collector of which is connected to the data transmitting output 312, and the emitter to earth. The data receiving input 313 of the data interface stage 310 is connected to an invertor 316 which is connected to the base of an open collector transistor 318 via a resistor 317. The data I/O 311 of the data interface stage 310 is also connected to the anode of a diode 319, the cathode of which is connected to the collector of the transistor 318. The diode 319 acting as a voltage source. The emitter of the transistor 318 is connected to earth. In the situation where the data wire 102 and data I/O 311 were floating HIGH at voltage Vss, when the open collector transistor 318 is switched on, the data I/O 311 and data wire 102 are pulled down to a voltage Vtt. The reference voltage Vmed and Voltage Vtt are chosen such that Vss>Vhigh>Vtt>Vmed>Vuu.

The clock I/O 321 of the clock interface stage 320 is connected to an input of a comparator 324, the other input of which is connected to a reference voltage Vmed. The output of the comparator 324 is connected to the base of an open collector transistor 325, the collector of which is connected to the clock transmitting output 322, and the emitter to earth. The clock receiving input 323 of the clock interface stage 320 is connected to an invertor 326 which is connected to the base of an open collector transistor 328 via a resistor 327. The clock I/O 321 of the clock interface stage is also connected to the anode of a diode 329, the cathode of which is connected to the collector of the transistor 328. The diode 329 acting as a voltage source. The emitter of the transistor 328 is connected to earth. The clock wire 103, clock interface stage 320 and clock wire 203 system has the same features as, and operates in the same manner as the data wire 102, data interface stage 310 and data wire 202 system. The voltages levels are the same for both.

The following is a description of the operation of the data interface stage 310 shown in FIG. 3. The clock interface stage 320 operates in the same manner and need not be described.

When the data wire 102 of the first transmission system shown in FIG. 1 is floating HIGH, then the voltage on the data I/O 311 will be Vss. As tie voltage Vss is greater than Vmed, the comparator 314 will switch off the transistor 315. Thus the data transmitting output 312 and data wire 202 of the second system 2 will be pulled up to the supply voltage Vss' through pull up resistor 230 and float HIGH, unless of course the data wire 202 is pulled down by a station 210. As the data receiving input 313 is coupled to the data transmitting output 312, then the voltage on the invertor 316 will be Vss'. In these circumstances the output of the invertor 316 will be low and the open collector transistor 318 will be turned off. Thus the data wire 102 will remain floating HIGH at voltage Vss. Thus all the stations 110 and stations 210 are able to detect that the state of their respective data wires 102 and 202 are in a HIGH state.

When the data wire 202 of the second transmission system shown in FIG. 1 is floating HIGH, then the voltage at data receiving input 313 will be Vss'. In these circumstances the output of the invertor 316 will be low and the open collector transistor 318 will be turned off. Thus the data wire 102 will float HIGH at voltage Vss, unless of course one of the stations 110 pulls down the data wire 102. As mentioned in the previous paragraph, when the voltage on the data I/O 311 is Vss, the comparator will switch off the transistor 314 and the data wire 202 will remain floating HIGH at the voltage Vss'. Thus all the stations 110 and stations 210 are able to detect that the state of their respective data wires 102 and 202 are in a HIGH state.

When a station 210 pulls down the voltage on the data wire 202 to a voltage Vuu', then the voltage on the data receiving input 313 will be Vuu'. In these circumstances the invertor 316 will switch on the open collector transistor 318 which will pull down the data I/O 311 and data wire 102 to the voltage level Vtt. As the voltage Vtt is greater than Vmed, the comparator 314 will switch off the transistor 315 and the data transmitting output 312 will not be active. Thus a logic LOW will not propagate from the data receiving input 313 to the data transmitting output 312 via the first transmission system 1 because of the medium voltage level Vtt. This prevents the latching of the interface device 3. As the data transmitting output 312 is connected to the data transmitting input 313, the later will pull the data transmitting output 312 LOW to Vuu'. The transmitting data output 312 will be pulled LOW to Vuu' by the station 210 but NOT by the interface device 3. Thus as soon as the station 210 releases the data wire 202, that is switches off it's transistor 128, the data wire 202 will go HIGH again. In the above mentioned state where a station 210 pulls down the voltage on the data wire 202 to Vuu', then all the stations 210 are able to detect that the data wire 202 is LOW as Vuu'<Vhigh' and all the stations 110 are able to detect that the data wire 102 is LOW as Vtt<Vhigh.

When a station 110 pulls down the voltage on the data wire 102 to a voltage Vuu, the voltage on the data I/O 311 will be Vuu. As the voltage Vuu is less than Vmed, the comparator 314 switches on the open collector transistor 315. In these circumstances the data transmitting output 312 and data wire 202 of the second system will be pulled down to the voltage Vuu' by the open collector transistor 315. As the data receiving input 313 is connected to the data transmitting output 312, then the voltage on the invertor 316 will be Vuu'. In these circumstances the output of the invertor 316 will be high and the open collector transistor 318 will be turned on. However the data wire 102 is already pulled down to the voltage Vuu and due to the circuit arrangement of the bus the open collector transistor 318 is unable to pull the voltage on the data wire 102 up to Vtt. Thus the voltage on the data wire 102 remains at Vuu. All the stations 110 are able to detect that the data wire is LOW as Vuu<Vhigh and all the stations 210 are able to detect that the data wire 202 is LOW as Vuu'<Vhigh'. When the station 110 releases the data wire 102, that is switches off it's transistor 128, the data wire 102 will initially pull up to voltage Vtt. As the voltage Vtt>Vmed, the comparator 314 will switch off the open collector transistor 315 and the data transmitting output 312 will float HIGH to voltage Vss'. This in turn will cause the transistor 318 to switch off and the data wire 102 will finally float HIGH to Vss.

The following is a table summarizing the above operation of the interface device 3 and showing the state of the data receiving input (RxD) 313, data I/O (Di/o) 311 and data transmitting output (TxD) 312 as detected by their relevant stations 110 and 210.

The arrow indicates the signal propagation.

TABLE 1

| RxD 313 | Di/o 311 | TxD 312 |
|---|---|---|
| HIGH----> | HIGH--------> | HIGH |
| LOW-----> | LOW---------> | HIGH |
|  | LOW---------> | LOW |

As can be seen from table 1 a logic HIGH will propagate in both directions, a logic LOW will propagate from the data I/O 311 to the data transmitting output 312, and a logic LOW will propagate from the data receiving input 313 to the data I/O 311, but a logic LOW will not propagate from the data receiving input 313 to the data transmitting input 312 because of the medium voltage level that is then present on the data I/O 311. Whilst the medium voltage level on the data I/O 311 is detected by the stations 110 as being LOW, the interface device 3 detects the medium voltage level as being HIGH. It is by this means the latching is prevented.

The embodiment described with reference to FIGS. 1, 2 and 3 is an example of one system only. A whole series of bi-directional signal transmission systems may be connected together via a number of such interface devices 3 to form a single transmission system. Thus in theory there is no limit to the number of stations that can be connected in such a system.

Figure 4:
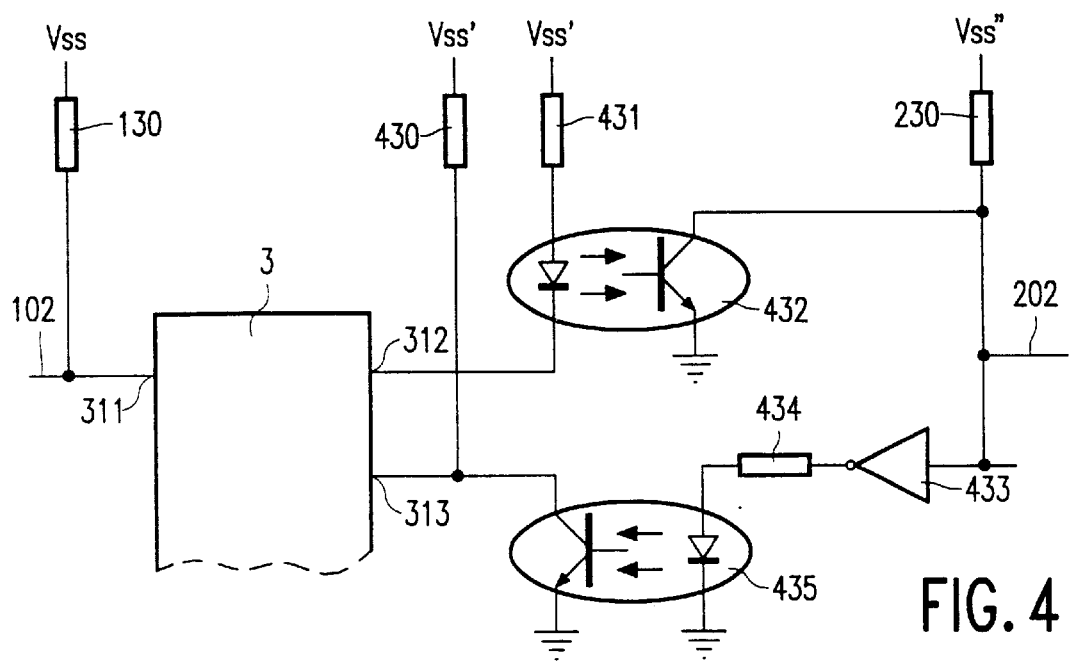
FIG. 4 shows a second embodiment of the bi-directional signal transmission system in accordance with the invention having an interface device as shown in FIG. 3.

FIG. 4 shows a second embodiment of the bi-directional signal transmission system in accordance with the invention having an interface device as shown in FIG. 3. The interface device 3 is coupled by it's data I/O 311 to the data wire 102 of a transmission system 1 of the type shown in FIG. 1. The interface device is also coupled to the data wire 202 of a transmission system 2 of the type shown in FIG. 1. Only the data wire 102 and data wire 202 of the first and second transmission systems and the data interface stage of the interface device 3 are shown in FIG. 4. The clock wires 103, 203 of the first and second transmission systems and the clock interface stage of the interface device 3 are coupled and operate in the same manner as the data wires 102,202 and the data interface stage and as such are not shown.

In FIG. 4, the data transmitting output 312 is coupled to the data wire 202 via an opto-coupler 432. The data wire 202 is coupled to the data receiving input 313 via an invertor 433, resistor 434 and an opto-coupler 435. The data receiving input 313 is coupled to the supply voltage Vss' by a pull up resistor 430. The data transmitting output 312 is coupled to the supply voltage Vss' via the opto-coupler 432 and pull up resistor 431. The provision of the two opto-couplers 432 and 435 provides galvanic separation of the first and second transmission systems and this simple arrangement is suitable for simple low speed applications.

In operation when the data transmitting output 312 is HIGH (the transistor 315 of FIG. 3 is off), the diode of the opto-coupler 432 is not on and the photo-transistor of the opto-coupler is an off state. Thus the data wire 202 may float HIGH to Vss'. When the voltage on the data transmitting output 312 is LOW (the transistor 315 is on) the diode of the opto-coupler 432 is on, and the photo-transistor of the opto-coupler is an on state and the data wire 202 will be pulled LOW to a voltage Vuu'. When the data wire is floating HIGH at Vss', the output of the invertor 433 is low and the diode of the opto-coupler 435 is off and thus the phototransistor of the opto-coupler 435 is an off state. Thus data receiving input 313 will float HIGH to the supply voltage Vss'. When the voltage on the data wire 202 is Vuu' (LOW), the output of the invertor 433 will be HIGH and the diode and photo-transistor of the opto-coupler 435 will be on. Thus the data receiving input 313 will be pulled down LOW to the voltage Vuu'. It will be obvious that high speed operation is also possible by use of high speed opto-couplers with the appropriate adapted drive to them.

In a further embodiment of the invention not shown, the interface device 3 is connected via the data I/O to a first transmission system of the type shown in FIG. 1. The data transmitting output 312 and data receiving input 313 are connected to the respective input and output of a differential bus interface device to, for example, a CAN bus using an interface IC. At other nodes of the CAN bus, the input and output of the CAN bus interface IC are connected to the respective data transmitting outputs 312 and data receiving inputs 313 of further interface devices 3, the data I/O of which are connected to further transmission systems of the type shown in FIG. 1. In this embodiment it is possible to have over 100 nodes with over 100 first transmissions systems coupled by means of the CAN bus.

In the above embodiments a dual interface device 3 is shown. Namely the interface device 3 has both a data interface stage and clock interface stage which operate in the same manner and are coupled to respective data wires and clock wires. As will be appreciated by the man skilled in the art, the clock bus wires may also be configured as a single master system and as such a clock buffer different to the clock interface stage may be used together with a data interface stage of the type described herein.

It should be noted that the above-mentioned embodiments illustrate rather than limit the invention, and those skilled in the art will be able to design many alternative embodiments without departing from the scope of the invention.

What is claimed is:

1. A bi-directional signal transmission system comprising:
    a first bi-directional signal path capable of generating thereon a logic high level,
    one or more first stations coupled to the first bi-directional signal path and each capable of generating on the first bi-directional signal path a logic low level;
    an interface device coupled to the first bi-directional signal path said interface device having a receive input and a transmit output; and
    a second bi-directional signal path coupled to the receive input and the transmit output of the interface device, the interface device comprising:
        first means for generating on the first bi-directional signal path a medium logic level in response to a low logic level on the receive input, and
        second means for generating on the transmit output a low logic level in response to a low logic level on the first bi-directional signal path, and for otherwise generating a high logic level on said transmit output,
        the one or more first stations being adapted to detect the medium and the low logic levels on the first bi-directional signal path as a logic LOW and the high logic level on the first bi-directional signal path as a logic HIGH.

2. A bi-directional signal transmission system as claimed in claim 1, wherein the first means of the interface device comprises:
    an invertor, the input of said inverter is coupled to the receive input and the output of said inverter is connected to a base of an open collector transistor, and
    a voltage source which is connected between the first signal bi-directional signal path and the open collector transistor,
    the invertor, in response to a high logic level on the receive input, switches off the open collector transistor, and in response to said low logic level on the receive input switches on the open collector transistor, the open collector transistor in the on state pulling the first signal bi-directional path down to said medium logic level and in the off state allowing the first signal bi-directional path to remain at said high logic level.

3. A bi-directional signal transmission system as claimed in claim 1 wherein the second means of the interface device comprises a comparator one input of said comparator is coupled to the first signal bi-directional path, the other input of said comparator is coupled to a voltage reference source, the comparator having an open collector transistor output coupled to the transmit output of the interface device, the second means generating on the transmit output said low logic level when the logic level on the first bi-directional signal path is below the voltage reference source, and generating on the transmit output said high logic level when the logic level on the first bi-directional signal path is equal to or greater than the voltage reference source.

4. A bi-directional signal transmission system as claimed in claim 1 wherein the transmit output and the receive output of the interface device are directly connected to the second bi-directional signal path.

5. A bi-directional signal transmission system as claimed in claim 1 wherein the transmit output of the interface device is coupled to the second bi-directional signal path via a first opto-coupler and the second bi-directional signal path is coupled to the receive input via a second opto-coupler.

6. A bi-directional signal transmission system as claimed in claim 1 wherein the transmit output of the interface device is coupled via a differential bus to the receive input of a further interface device which is coupled to said second bi-directional signal path, and the transmit output of the further interface device is coupled via the differential bus to the receive input of the first mentioned interface device.

7. A bi-directional signal transmission system as claimed in claim 1 wherein the first and second bi-directional signal paths are data paths.

8. A bi-directional signal transmission system as claimed in claim 1 wherein the first and second bi-directional signal paths comprise both a data path and a clock path and the interface device comprises a first interface stage and a second interface stage, the data path of the first bi-directional signal path is coupled to the data path of said second bi-directional signal path via the first interface stage, and the clock path of the first bi-directional signal path is coupled to the clock path of the second bi-directional signal path via the second interface stage.

9. An interface device for use in a bi-directional signal transmission system, the system comprising:
    a first bi-directional signal path capable of generating thereon a logic high level,
    one or more first stations coupled to the first bi-directional signal path and each capable of generating on the first bi-directional signal path a logic low level; and
    a second bi-directional signal path, wherein the one or more first stations are adapted to detect a medium logic level and the low logic level on the first bi-directional signal path as a logic LOW and the high logic level on the first bi-directional signal path as a logic HIGH, the interface device adapted to be coupled to the first bi-directional signal path and having a receive input and a transmit output adapted to be coupled to, the second bi-directional signal path,
    the interface device comprising:
        first means for generating on the first bi-directional signal path said medium logic level in response to a low logic level on the receive input; and
        second means for generating on the transmit output a low logic level in response to a said low logic level on the first bi-directional signal path and otherwise for generating a high logic level on said transmit output.

10. An interface device as claimed in claim 9, wherein the first means of the interface device comprises:
    an invertor, the input of said inverter is coupled to the receive input and the output of said inverter is connected to a base of an open collector transistor, and
    a voltage source which is connected between the first signal bi-directional signal path and the open collector transistor, the invertor in response to a high logic level on the receive input switching off the open collector transistor and in response to said low logic level on the receive input switching on the open collector transistor, the open collector transistor in the on state pulling the first signal bi-directional path down to said medium logic level and in the off state allowing the first signal bi-directional path to remain at said high logic level.

11. An interface device as claimed in claim 9, wherein the second means of the interface device comprises:

a comparator one input of said comparator is coupled to the first signal bi-directional path, the other input of said comparator is coupled to a voltage reference source, the comparator having an open collector transistor output coupled to the transmit output of the interface device, the second means generating on the transmit output said low logic level when the logic level on the first bi-directional signal path is below the voltage reference source, and generating on the transmit output a high logic level when the logic level on the first bi-directional signal path is greater than the voltage reference source.

12. An interface device as claimed in claim 10, wherein the second means of the interface device comprises:

a comparator one input of said comparator is coupled to the first signal bi-directional path, the other input of said comparator is coupled to a voltage reference source, the comparator having an open collector transistor output coupled to the transmit output of the interface device, the second means generating on the transmit output said low logic level when the logic level on the first bi-directional signal path is below the voltage reference source, and generating on the transmit output a high logic level when the logic level on the first bi-directional signal path is greater than the voltage reference source.

* * * * *